US00RE49149E

(19) United States
(12) Reissued Patent
Bae et al.

(10) Patent Number: US RE49,149 E
(45) Date of Reissued Patent: Jul. 26, 2022

(54) METHOD FOR DETECTING TWO DIMENSIONAL SKETCH DATA FROM SOURCE MODEL DATA FOR THREE DIMENSIONAL REVERSE MODELING

(71) Applicant: 3D Systems Korea, Inc., Seoul (KR)

(72) Inventors: Seock Hoon Bae, Los Altos, CA (US); Dong Hoon Lee, Goyang (KR); Kang Hoon Chung, Seongnam (KR)

(73) Assignee: 3D Systems, Inc., Rock Hill, SC (US)

(21) Appl. No.: 16/435,242

(22) Filed: Jun. 7, 2019

Related U.S. Patent Documents

Reissue of:
(64) Patent No.: 7,830,376
Issued: Nov. 9, 2010
Appl. No.: 11/595,135
Filed: Nov. 10, 2006

(30) Foreign Application Priority Data

May 4, 2006 (KR) ..... 10-2006-0040659

(51) Int. Cl.
*G06F 30/00* (2020.01)

(52) U.S. Cl.
CPC ..... *G06F 30/00* (2020.01)

(58) Field of Classification Search
CPC ..... G06F 30/00
See application file for complete search history.

(56) References Cited

U.S. PATENT DOCUMENTS 6,438,263 B2 8/2002 Albeck et al.
6,633,836 B1 10/2003 Yamaura
(Continued)

FOREIGN PATENT DOCUMENTS

GB 2 402 765 12/2004
JP H07182454 7/1995
(Continued)

OTHER PUBLICATIONS

Bimber, Oliver; Encarnação, L. Miguel; Stork, André: A Multi-layered Architecture for Sketch-based Interaction within Virtual Environments Computers & Graphics 24 Dec. 2000, 6, S. 851-867.*
(Continued)

*Primary Examiner* — Cameron Saadat

(57) ABSTRACT

A method for detecting two dimensional sketch data from source model data for three dimensional reverse modeling. The method includes the steps of detecting optional model data, establishing X-axis, Y-axis and Z-axis of the model data depending upon a reference coordinate system information inputted from a user, and setting a work plane for detecting two dimensional section data of the model data; projecting, on the work plane, two dimensional section data to be detected from the model data or polylines detected by designating a detection position; detecting two dimensional projected section data of the model data projected on the work plane, and dividing the two dimensional projected section data into feature segments depending upon a curvature distribution; and establishing a constraint and numerical information in accordance with connection of the divided feature segments of the two dimensional projected section data, and creating two dimensional sketch data.

15 Claims, 10 Drawing Sheets

(56) References Cited

U.S. PATENT DOCUMENTS

| | | | | |
|---|---|---|---|---|
| 7,170,509 | B2 * | 1/2007 | Tanaka et al. | 345/419 |
| 7,209,136 | B2 | 4/2007 | Grau | |
| 7,215,430 | B2 | 5/2007 | Kacyra et al. | |
| 7,428,480 | B2 | 9/2008 | Deguchi | |
| 7,468,725 | B2 * | 12/2008 | Takagi | 345/420 |
| 7,649,976 | B2 | 1/2010 | Georgeson et al. | |
| 7,761,266 | B2 | 7/2010 | Mangon et al. | |
| 8,036,450 | B2 | 10/2011 | Bertola et al. | |
| 8,259,101 | B2 | 9/2012 | Shimada et al. | |
| 2001/0055013 | A1 | 12/2001 | Fuki | |
| 2003/0052875 | A1 * | 3/2003 | Salomie | 345/419 |
| 2003/0071810 | A1 | 4/2003 | Shoov et al. | |
| 2003/0231793 | A1 * | 12/2003 | Crampton | 382/154 |
| 2005/0068329 | A1 * | 3/2005 | Hanau | 345/589 |
| 2006/0012611 | A1 * | 1/2006 | Dujmich | 345/619 |

FOREIGN PATENT DOCUMENTS

| | | |
|---|---|---|
| JP | H09223248 | 8/1997 |
| JP | H11272718 | 10/1999 |
| JP | 2000057184 | 2/2000 |
| JP | 2003263464 | 9/2003 |
| JP | 03938687 | 4/2007 |

OTHER PUBLICATIONS

Kim Lee, Inside 3ds max® 4, Dec. 2002, Indianapolis, Ind. : New Riders, p. 1 of 26 through p. 3 of 26.*

* cited by examiner

METHOD FOR DETECTING TWO DIMENSIONAL SKETCH DATA FROM SOURCE MODEL DATA FOR THREE DIMENSIONAL REVERSE MODELING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*RELATED APPLICATION*

*This is a reissue application of U.S. Pat. No. 7,830,376, filed Nov. 10, 2006, issued Nov. 9, 2010, and which claims the benefit of priority to Korean Patent Application No. 10-2006-0040659, filed May 4, 2006.*

BACKGROUND OF THE INVENTION

1. Field of the Invention

The present invention relates to detection of two dimensional sketch data for three dimensional modeling, and more particularly to a method for detecting two dimensional sketch data for three dimensional modeling, which can produce three dimensional model data using two dimensional sketch data.

2. Description of the Prior Art

As is generally known in the art, in operation of a digital production system utilizing CAD/CAM/CAE, a digital model such as a three dimensional CAD model of a part is necessarily required. Specifically, representative fields in which reproduction work using reverse engineering is utilized typically includes a hand-made prototype, an old article, a competitor's product, human body scanning, and so on.

In order to cooperatively perform the reproduction work process with an existing work process, the reproduced model must be supported so as to be reutilized in a CAD system and must ensure product quality to allow mass production.

However, it is not easy to acquire digital data which can be utilized in an actual production site and can ensure product quality.

Also, the data acquired by actually scanning a product or a part have an error to some extent when compared to those of a CAD model designed through a production process. Moreover, surrounding circumstances or an error rate of a scanner itself may change data during a scanning operation.

For these reasons, it is very difficult to create a solid model from scanned data, such as that created by CAD, and in some cases, it may be impossible to create a solid model from scanned data.

Further, in the case that operational processes, in which a prototype model is scanned, simulated on a computer, physically processed and manually changed, are repeated, the precise shape information of a digital model may be damaged or distorted in the course of conducting modification work, and a difference is caused between a designed CAD model and the actual prototype model.

Furthermore, since the model data detected from the scanned data or by a method such as surface-fitting of a model, etc. are not parametrically connected with one another, when a user inputs new numerical information or corrects erroneous model data, only the corresponding specific portion of the data is changed or corrected, and other portions connected to the specific portion are not changed or corrected.

In addition, because the method such as surface-fitting, etc. detects only the outer surface of a model, it is difficult to acquire precise shape information.

SUMMARY OF THE INVENTION

Accordingly, the present invention has been made to solve the above-mentioned problems occurring in the prior art, and an object of the present invention is to provide a method for detecting two dimensional sketch data from source model data for three dimensional reverse modeling, which detects, from optional model data, feature regions of a two dimensional section for three dimensional modeling, and causes sectional shapes and numerical information for the detected feature regions of the two dimensional section to be parametrically connected and displayed.

In order to achieve the above object, according to one aspect of the present invention, there is provided a method for detecting two dimensional sketch data from source model data for three dimensional reverse modeling, including the steps of a) detecting optional model data, establishing X-axis, Y-axis and Z-axis of the model data depending upon a reference coordinate system information inputted from a user, and setting a work plane for detecting two dimensional section data of the model data; b) projecting, on the work plane, two dimensional section data to be detected from the model data or polylines detected by designating a detection position; c) detecting two dimensional projected section data of the model data projected on the work plane, and dividing the two dimensional projected section data into feature segments depending upon a curvature distribution; and d) establishing a constraint and numerical information in accordance with connection of the divided feature segments of the two dimensional projected section data, and creating two dimensional sketch data.

According to another aspect of the present invention, the two dimensional section data of the step b) is established at a position which is vertically offset from the work plane or is determined by rotating the work plane about a measurement axis.

According to another aspect of the present invention, the two dimensional section data of the step b) is converted into a UV coordinate system by rotating the work plane and is then established in U and V directions thereof.

According to another aspect of the present invention, when the two dimensional section, data of the step b) has a draft, a measurement range having the draft is established so as to acquire a precise section from the measured model data, and a silhouette of the model data which is included in the established measurement range is projected on the work plane.

According to another aspect of the present invention, the measurement range corresponds to a region between two planes established by the user.

According to another aspect of the present invention, a value of the draft corresponds to a cosine of a triangle which is formed by a base corresponding to a distance between the two planes and a height corresponding to a difference in size between two dimensional section data respectively projected on the two planes.

According to another aspect of the present invention, the step b) includes the step of inserting a polyline optionally selected by the user into a feature region projected on the work plane or of overlapping a polyline detected from the model data and having a third specific shape on the feature region projected on the work plane.

According to another aspect of the present invention, the feature segment projected on the work plane in the step c) is one selected from the group consisting of a straight line, a circle, an arc, a free curve, a rectangle, a polygon and a slot.

According to another aspect of the present invention, the constraint and numerical information of the step d) are conditions which are fitted from the feature segments of the two dimensional projected section data including a straight line, a circle, an arc, a free curve, a rectangle, a polygon and a slot, or which are set by the user to satisfy at least one of verticality, horizontality, parallelism, slopeness, junction, fixing, correspondence, the same straight line, concentricity, the same radius, and the same distance between the feature segments.

According to another aspect of the present invention, the constraint and numerical information are automatically established in accordance with an internal tolerance between the feature segments of the two dimensional projected section data or are manually established or corrected by data inputted from the user.

According to another aspect of the present invention, the feature segment to be manually established or corrected is selected through snapping for automatically fixing a cursor of a mouse in the vicinity of a node of points constituting the feature segment of the two dimensional projected section data to be established or corrected.

According to another aspect of the present invention, the feature segment of the two dimensional projected section data is displayed by being highlighted.

According to another aspect of the present invention, the feature segments, constraint and numerical information of the two dimensional projected section data projected on the work plane are parametrically connected with one another.

According to still another aspect of the present invention, the created two dimensional sketch data is displayed as one element of a feature tree.

According to a still further aspect of the present invention, the model data is one selected from the group consisting of scanned data, point cloud data, mesh data, general CAD data, and CAD data having curved surfaces.

BRIEF DESCRIPTION OF THE DRAWINGS

The above and other objects, features and advantages of the present invention will be more apparent from the following detailed description when taken in conjunction with the accompanying drawings, in which.

DETAILED DESCRIPTION OF THE PREFERRED EMBODIMENTS

Figure 1:
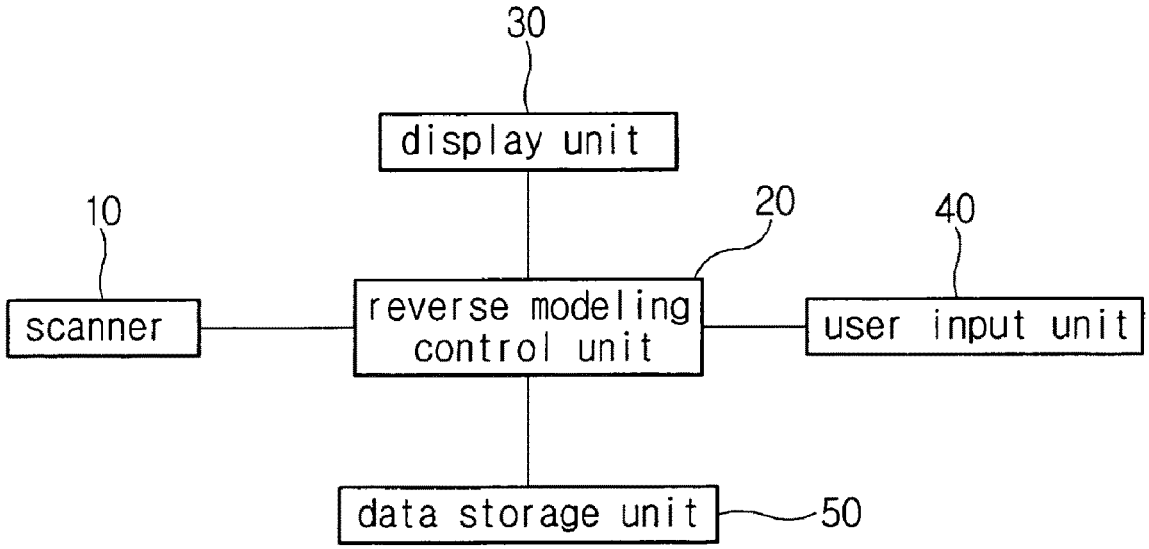
FIG. 1 is a block diagram illustrating the construction of a system for detecting two dimensional sketch data from source model data for three dimensional reverse modeling in accordance with the present invention.

Hereinafter, a preferred embodiment of the present invention will be described with reference to the accompanying drawings. In the following description and drawings, the same reference numerals are used to designate the same or similar components, and so repetition of the description on the same or similar components will be omitted.

FIG. 1 is a block diagram illustrating the construction of a system for detecting two dimensional sketch data of model data for three dimensional modeling in accordance with the present invention. Referring to FIG. 1, the system for detecting two dimensional sketch data of model data for three dimensional modeling includes a scanner 10 for measuring a modeling object, a reverse modeling control unit 20 for controlling the entire modeling system and performing a modeling function, a display unit 30 for outputting scan data detected from the scanner 10 or model data produced by transforming the scan data to allow a user to confirm the data, a user input unit 40 for detecting setting data inputted from the user, and a data storage unit 50 for storing the three dimensional scan data or the model data and two dimensional sketch data detected from the scan data or the model data.

The scanner 10 is a component part for acquiring scan data through measuring the object, and preferably, includes a three dimensional scanner.

The model data which is the modeling object in the present invention includes point cloud data detected from the scanner 10, the scan data, the model data produced by transforming the scan data, general CAD data, CAD data having curved surfaces, and polylines produced in a variety of ways by connecting line segments through graphics in an external device such as a computer. Hereinbelow, these data will be referred to as model data.

The reverse modeling control unit 20 analyzes optional model data, establishes the X-axis, Y-axis and Z-axis of the model data depending upon the reference coordinate system information inputted from the user input unit 40, and sets a work plane for detecting the two dimensional section data of the established model data.

Also, the reverse modeling control unit 20 analyzes the two dimensional projected section data of the model data projected on the work plane to produce and store two dimensional sketch data, and parametrically displays the produced two dimensional sketch data on the display unit 30. Here, the two dimensional section data of the three dimensional model data projected on the work plane is defined as two dimensional projected section data, and the data produced by fitting the two dimensional projected section data is defined as two dimensional sketch data.

The reverse modeling control unit 20 analyzes the distribution of the two dimensional projected section data projected on the work plane depending upon a curvature distribution, extracts the feature segments (for example, a straight line, a circle, an arc, a free curve, a rectangle, a polygon, a slot, etc.) of the two dimensional projected section data depending upon the curvature distribution of the analyzed two dimensional projected section data, and detects the coordinate system information and numerical information of the feature segments.

Here, the curvature means a rate of change in the direction of a curved line, which is mediated by the length of an arc. Through the curvature distribution of the two dimensional projected section data projected on the work plane, the silhouette of the two dimensional projected section data which is composed of straight lines, circles, arcs, free curves, rectangles, polygons, slots, etc. can be displayed.

The reverse modeling control unit 20 parametrically establishes the connection relationships of the feature segments by using the numerical information of the detected feature segments as parameters, and displays the established feature segments and numerical information on the display unit 30.

The display unit 30 parametrically displays and outputs, preferably through a feature tree, the model data, the information regarding the directions of the X-axis, Y-axis and Z-axis, which is inputted from the user input unit 40, the work planes produced by the reverse modeling control unit 20, the two dimensional projected section data projected on the work plane, and the feature segments and numerical information of the two dimensional projected section data detected in the course of forming the two dimensional sketch data, which are produced based on the two dimensional projected section data.

The user input unit 40 includes input means such as a keyboard, a mouse, etc. The user input unit 40 inputs establishment information for establishing the reference coordinate system of the model data displayed on the display unit 30, the feature segments detected from the two dimensional projected section data of the model data, correction information for correcting the numerical information of the feature segments, and so on.

The data storage unit 50 stores the model data, the two dimensional sketch data produced by the reverse modeling control unit 20, etc.

Figure 2:
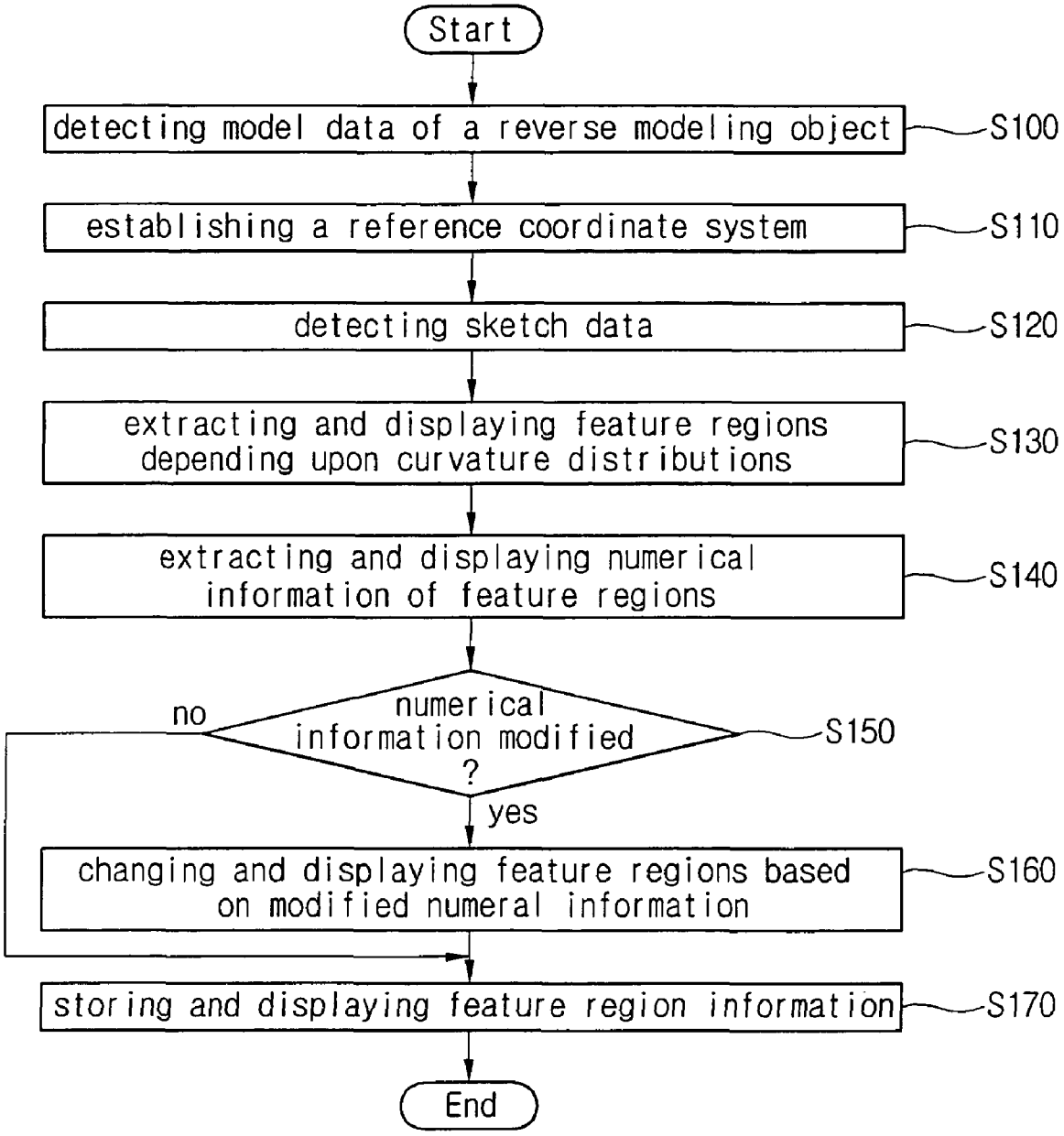
FIG. 2 is a flow chart illustrating a method for detecting two dimensional sketch data from source model data for three dimensional reverse modeling in accordance with the present invention.

FIG. 2 is a flow chart illustrating a method for detecting two dimensional sketch data of the model data for three dimensional modeling in accordance with the present invention. The method for detecting two dimensional sketch data of the model data for three dimensional modeling will be described below with reference to FIGS. 1 and 2.

The reverse modeling control unit 20 for producing the two dimensional sketch data of the model data detects the model data through the scanner 10 or an external device (for example, a computer system) and displays the detected model data through the display unit 30 (S100).

Figure 3:
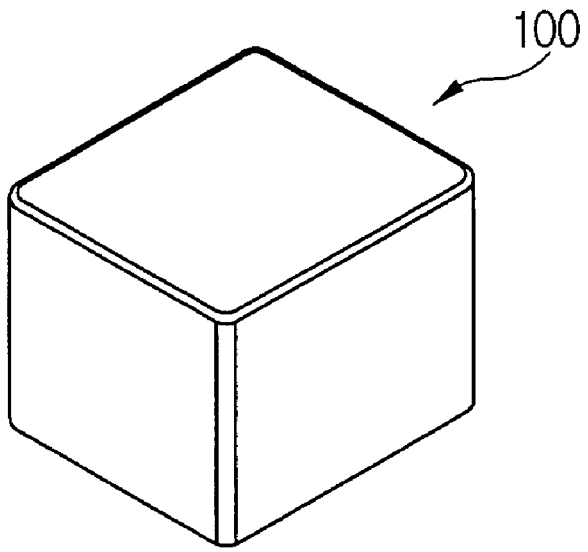
FIG. 3 is a perspective view illustrating optional model data in accordance with the present invention.

That is to say, as shown in FIG. 3, the reverse modeling control unit 20 detects the model data 100 of the modeling object through the scanner 10 and/or the external device. In this embodiment, the modeling object includes a regular hexahedron, fillets are formed on the corners of the modeling object, and the modeling object has a draft for injection molding.

Referring again to FIGS. 1 and 2, after implementing the step S100, the reverse modeling control unit 20 establishes the reference coordinate system including the X-axis, Y-axis and Z-axis of the model data 100 in accordance with the coordinate system establishment information which is inputted from the user input unit 40, to thereby establish the coordinates of the model data 100 (S110).

Figure 4:
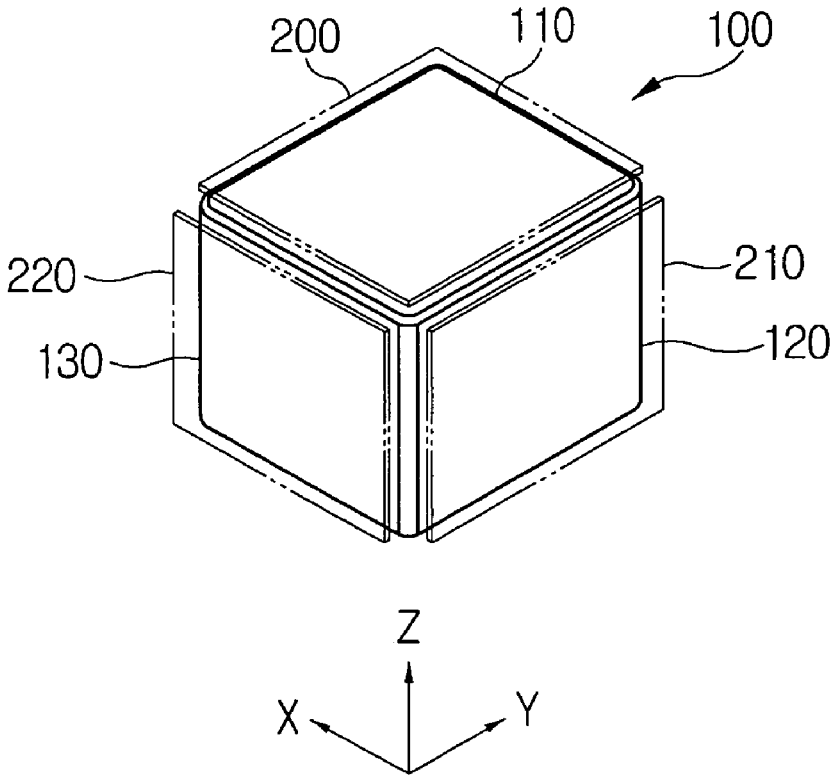
FIG. 4 is a view illustrating a process for setting a reference coordinate system for the model data shown in FIG. 3.

That is to say, as shown in FIG. 4, the user divides the model data 100 including the regular hexahedron into a first region 110, a second region 120 and a third region 130, and establishes an X-Y plane 200, a Y-Z plane 210 and a Z-X plane 220 as work planes for detecting two dimensional section data of the divided model data 100.

At this time, in a usual way of establishing the reference coordinate system, three reference surfaces, for example, the X-Y plane 200, the Y-Z plane 210 and the Z-X plane 220 are established, a local coordinate system is created at a position where the respective surfaces are crossed with one another, and the created local coordinate system is correlated with a global coordinate system.

As other ways of establishing the reference coordinate system, in the case where the CAD data of the modeling object exists, there are one way of minimizing the distance between the curved surface of the CAD data and the points of the model data, and another way of finding the reference points predefined in the CAD data and the corresponding points on the model data and minimizing the distance between these points.

Further, while it is possible to establish the X-Y plane 200, the Y-Z plane 210 and the Z-X plane 220 as basic work planes, it is also possible to establish an optional plane selected by the user as a work plane.

Referring again to FIGS. 1 and 2, if the establishment of the reference coordinate system of the model data is completed in the step S110, the reverse modeling control unit 20 outputs the work planes for detecting the two dimensional section data of the model data along with the model data to the display unit 30, and detects the two dimensional section data of the model data depending upon the detection information inputted from the user input unit 40 (S120).

Figure 5:
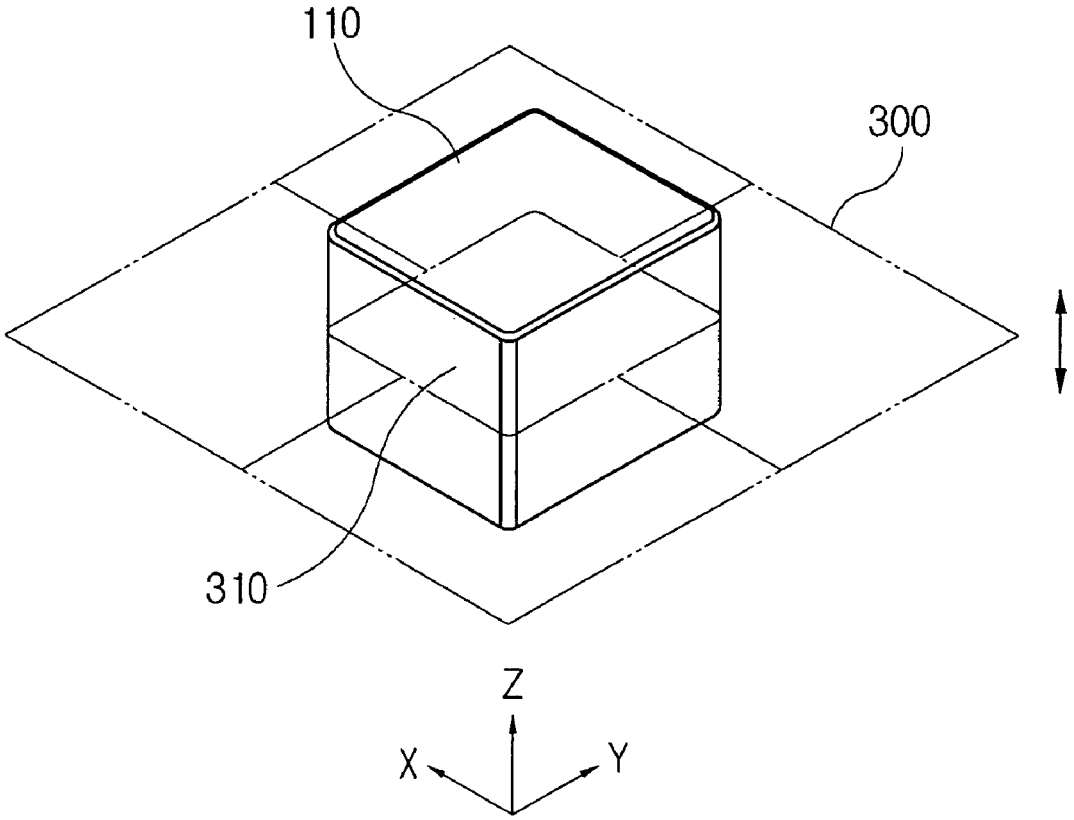
FIG. 5 is a view illustrating a process for projecting a two dimensional section silhouette of the model data shown in FIG. 3 on a work plane.

That is to say, as shown in FIG. 5, in order to extract the two dimensional section data of the model data, the first region 110 of the model data of which reference coordinate system is established in the step S110 (see FIG. 2) is projected on the work plane 300. Accordingly, a projected part 310 is formed on the work plane 300 as two dimensional projected section data.

At this time, as the two dimensional projected section data being a detection object, the section data of the model data, which is obtained at a position vertically offset from the work plane 300 or determined by rotating the work plane 300 about a measurement axis, is projected on the work plane 300.

Also, it is possible to convert the reference coordinate system into a UV coordinate system by rotating the work plane 300 and then establish U and V directions of the two dimensional section data. Also, the U and V directions of the specific two dimensional projected section data can be reestablished afterwards.

Further, in the case where the two dimensional projected section data has a draft for injection molding, it can be envisaged that a measurement range is established (for example, as a region between two planes determined by the user) so as to acquire a precise section from the detected model data, and the silhouette of the model data which is included in the established measurement range is projected on the work plane 300. The detection of the two dimensional projected section data of the model data having the draft will be described in detail with reference to FIG. 8.

Referring again to FIGS. 1 and 2, after the step S120 is implemented, the reverse modeling control unit 20 displays the two dimensional projected section data projected on the work plane 300 by dividing the two dimensional projected section data into feature regions including a straight line, a circle, an arc, a free curve, a rectangle, a polygon, a slot, etc. depending upon curvature distributions (S130).

That is to say, the reverse modeling control unit 20 automatically divides the two dimensional sketch region projected on the work plane 300 into a straight line, a circle, an arc, a free curve, a rectangle, a polygon, a slot, etc., and performs a fitting operation.

Figure 6:
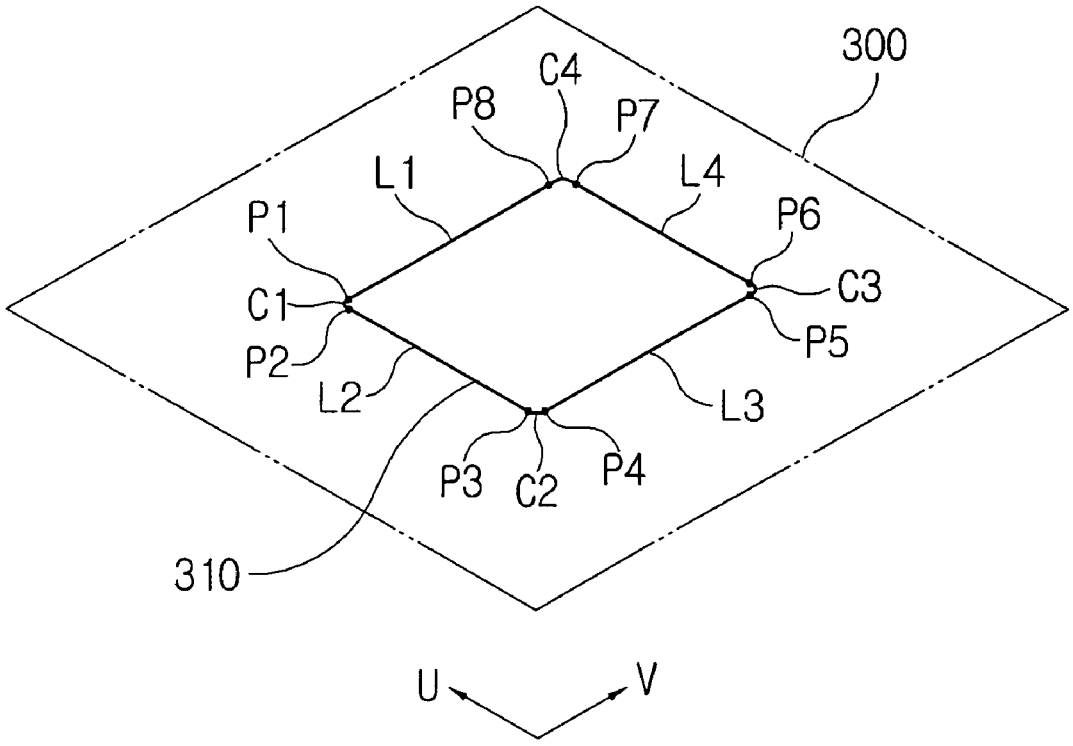
FIG. 6 is a view illustrating the two dimensional section silhouette projected on the work plane.

As shown in FIG. 6, the projected part 310 projected on the work plane 300 is composed of four straight lines L1 through L4, four arcs C1 through C4, and eight representative points P1 through P8.

In other words, as a result of the analyses of the curvature distribution of the two dimensional projected section data projected on the projected part 310, the portion extending from the starting point P8 of points over which the curvature of a plane curve is distributed to the starting point P1 of points over which the curvature of a curved curve is distributed is represented by a straight line L1, the portion extending from the starting point P1 of points over which the curvature of a curved curve is distributed to the starting point P2 of points over which the curvature of a plane curve is distributed is represented by an arc C1, and the portion extending from the starting point P2 of points over which the curvature of a plane curve is distributed to the starting point P3 of points over which the curvature of a curved curve is distributed is represented by a straight line L2.

Also, the portion extending from the starting point P3 of points over which the curvature of a curved curve is distributed to the starting point P4 of points over which the curvature of a plane curve is distributed is represented by an arc C2, the portion extending from the starting point P4 of points over which the curvature of a plane curve is distributed to the starting point P5 of points over which the curvature of a curved curve is distributed is represented by a straight line L3, and the portion extending from the starting point PS of points over which the curvature of a curved curve is distributed to the starting point P6 of points over which the curvature of a plane curve is distributed is represented by an arc C3.

Further, the portion extending from the starting point P6 of points over which the curvature of a plane curve is distributed to the starting point P7 of points over which the curvature of a curved curve is distributed is represented by a straight line L4, and the portion extending from the starting point P7 of points over which the curvature of a curved curve is distributed to the starting point P8 of points over which the curvature of a plane curve is distributed is represented by an arc C4. In these ways, the feature segments of the two dimensional projected section data of the projected part 310 can be extracted.

Figure 7:
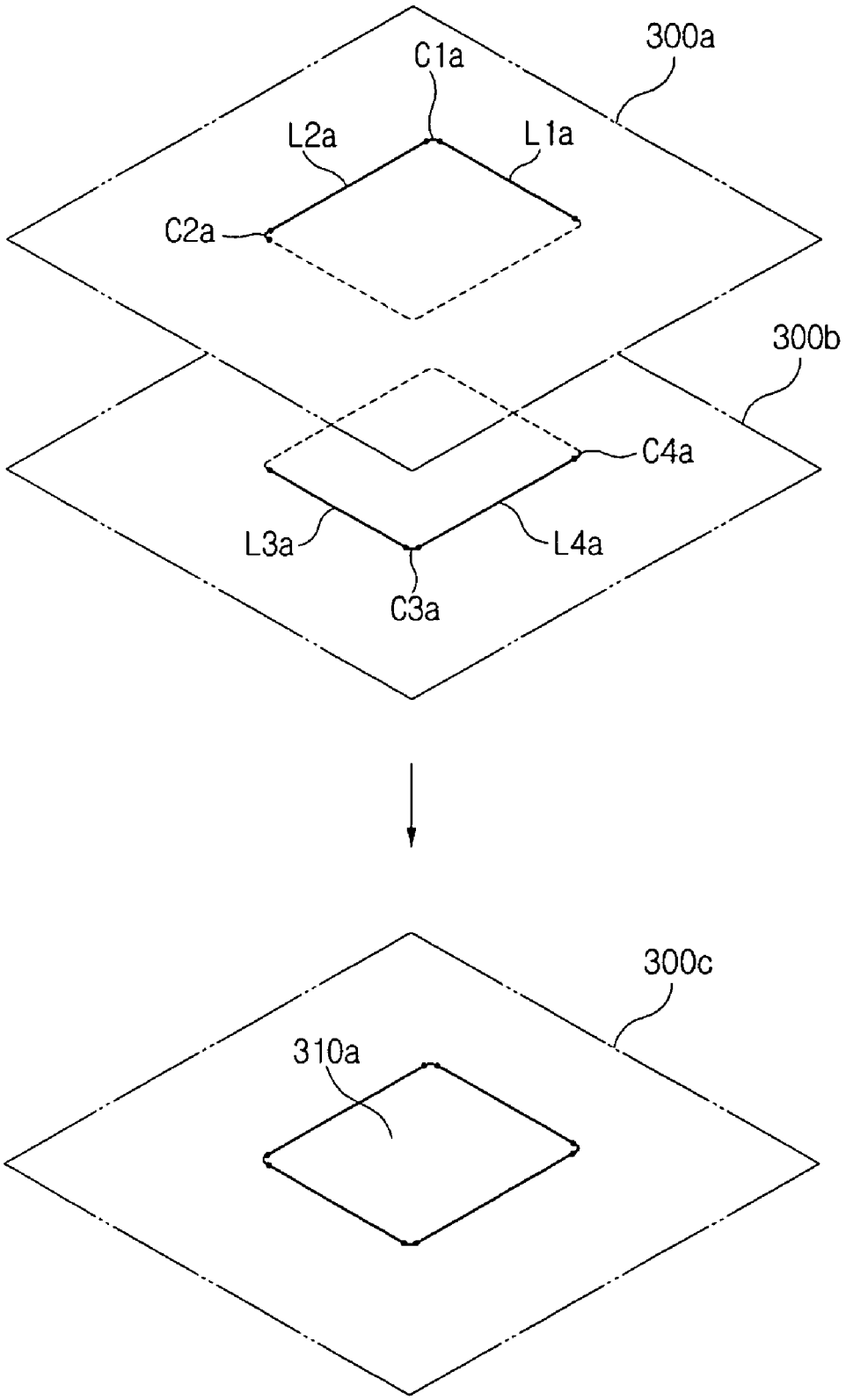
FIG. 7 is a view illustrating another embodiment of detecting a two dimensional section silhouette.

Moreover, as shown in FIG. 7, it is possible to extract the feature segments of the two dimensional projected section data of the model data from at least two work planes 300a and 300b.

That is to say, in order to extract an optimal projected part, some feature segments (for example, straight lines L1a and L2a and arcs C1a and C2a) of the feature segments of the two dimensional projected section data of the model data are detected from the first work plane 300a, and, in order to detect the remaining feature segments of the two dimensional projected section data of the model data, the remaining two dimensional projected section data (for example, straight lines L3a and L4a and arcs C3a and C4a) of the model data are projected on and extracted from the second work plane 300b having the same axis as the first work plane 300a. Then, the remaining feature segments of the two dimensional projected section data of the model data detected from the second work plane 300b are coupled with the feature segments of the two dimensional projected section data of the model data detected from the first work plane 300a, through overlapping on a third projection plane 300c. In this way, the feature regions detected from a plurality of planes can be detected on one projection plane as an optimal projected part 310a, that is, as the feature segments of the two dimensional projected section data.

Referring again to FIG. 6, differently from the intention of an actual designer, the feature segments produced by being automatically fitted on the work plane 300 may be produced at positions which are slightly deviated from the reference coordinate system, without any predefined constraint (for example, verticality, horizontality, parallelism, slopeness, junction, fixing, correspondence, the same straight line, concentricity, the same radius, the same distance, and so forth, between the feature segments of the two dimensional projected section data).

That is to say, the ending points between the respective feature segments of the two dimensional projected section data are separated from one another, and values such as a length, a radius, and the like, have some errors when compared to originally designed dimensions. This is to automatically or manually connect the ending points by internal tolerances and to allow the ending points to be automatically or manually established depending upon dimensions and constraint.

Figure 8:
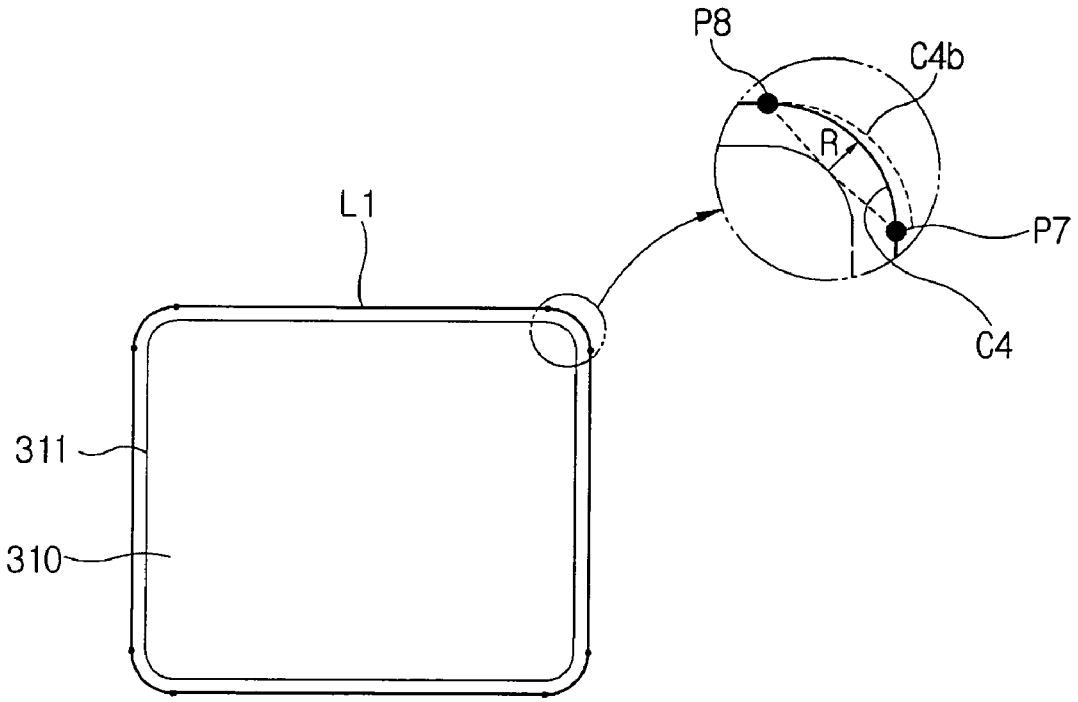
FIG. 8 is a view illustrating a process for automatically setting the two dimensional section silhouette projected on the work plane.

In other words, as shown in FIG. 8, if the ending point P7 of a straight line and the ending point of an arc C4b projected on the projected part 310 approach within a predetermined distance, they are caused to meet each other. As the case may be, the ending points of a straight line and an arc can be extended to meet each other.

Also, it is possible for the user to establish a new arc C4 using a snapping function at a node of the two dimensional projected section data and to produce a new sketch element. Namely, snapping is a skill of automatically fixing the cursor of a mouse in the vicinity of the node. In order for the user to properly establish the curve C4b, in the course of moving the cursor of the mouse including the user input unit 40 (see FIG. 1) toward the point P7 or P8, if the cursor of the mouse approaches one of the points P7 and P8 to be placed within a predetermined range, the cursor of the mouse is fixed to one of the points P7 and P8 through snapping.

Thereafter, as the user moves the cursor of the mouse from the fixed point (here, it is assumed that the cursor of the mouse is fixed to the point P8) to the point P7 to which the newly established arc C4 will be connected, the cursor of the mouse is fixed to the point P7 through snapping, and the new arc C4 is established.

Further, it is possible to set a slope so that two lines are tangential to each other when the direction of a slope at an ending point approaches within a predetermined angle, and an angle, a length, a radius, and so forth, are automatically set based on rules such as rounding to the nearest whole number, rounding off, etc.

That is to say, if an angle between two straight lines of a projected feature region is 89.9°, the angle is automatically set to 90°. In this way, constraint between the respective feature regions is automatically invested, and the respective feature regions are parametrically connected with one another.

Also, it is possible to draw on the projected part 310 of the model data a polyline optionally selected by the user, or to establish a third feature shape detected from another model data, that is, two dimensional sketch data of a quadrangular shape, on the projected part 310, through overlapping.

Figure 9:
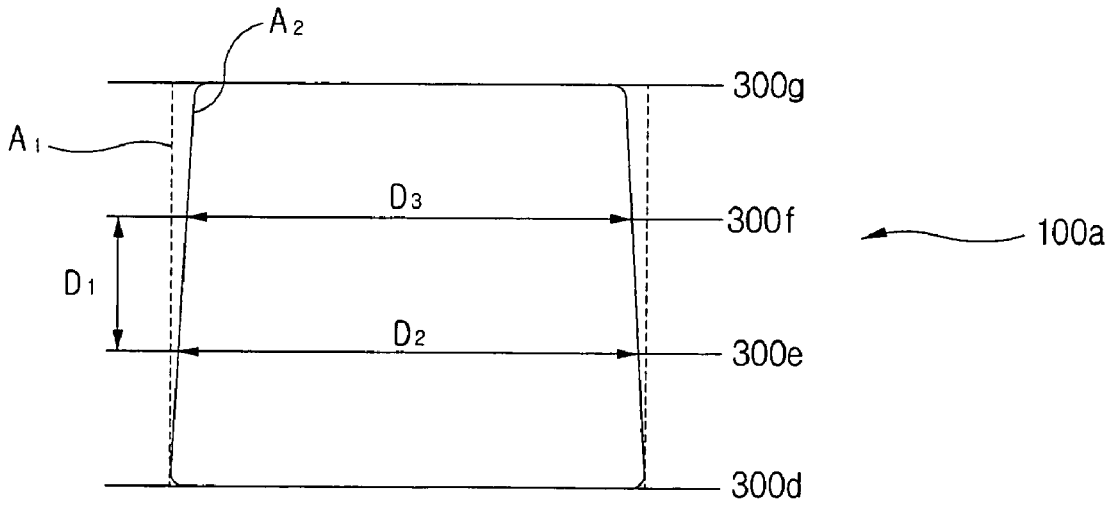
FIG. 9 is a view illustrating an embodiment for detecting a two dimensional section silhouette having a draft.

FIG. 9 illustrates an embodiment of detecting two dimensional sketch data having a precise section in the case of model data 100a having a draft.

Here, an original designer designs the model data 100a as a regular square which is represented by dashed lines A1. However, in the course of actually forming a product through injection molding, a draft is provided to the designed data of the regular square.

That is to say, while the initial design data is designed to be represented by the dashed lines A1, in the case where the designer places a draft for injection molding, the regular square is changed to a tapered shape represented by straight lines A2. In general, the angle of the draft is set to 0.5° to 2°.

As a consequence, since the model data measured using the scanner, etc. is detected as the regular square represented by the straight lines A2, it is necessary to detect the initially designed shape represented by the dashed lines A1.

At this time, while the two dimensional projected section data projected on a fourth projection plane 300d has an initially designed shape which is two dimensional section data to be detected, since the two dimensional projected section data projected on the fourth projection plane 300d is provided with a fillet or is rounded, it is difficult to detect precise shape and dimensions.

In consideration of this fact, the fourth projection plane 300d is first established on the lowermost region of the model data 100a, and two projection planes established by the user or automatically, that is, a fifth projection plane 300e and a sixth projection plane 300f are located at optional positions on the model data 100a.

Here, because it is possible to detect the distance D1 between the located fifth projection plane 300e and the sixth projection plane 300f and the lengths D2 and D3 of the two dimensional projected section data respectively projected on the fifth projection plane 300e and the sixth projection plane 300e, the value of the draft can be calculated using the detected distance D1 and the length difference (D2-D3). That is to say, when knowing the length of a base and a height of a triangle, the value of the draft can be calculated using sine, cosine and tangent laws of the triangle.

Hence, using the value of the draft which is calculated from, the fifth projection plane 300e and the sixth projection plane 300f, the value of the draft set to the model data 100a can be detected, and based on the detected value of the draft, the precise two dimensional projected section data projected on the fourth projection plane 300d can be detected.

The unexplained reference numeral 300g designates a projection plane which is established on the upper end of the model data 100a.

Referring again to FIGS. 1 and 2, the reverse modeling control unit 20 extracts the numeral information of the feature segments of the two dimensional projected section data which is extracted from the step S130 and displays the numerical information on the display unit 30 (S140).

After the step S140 is implemented, the two dimensional projected section data inputted from the user input unit 40 may significantly be deviated from the original model data. The feature segments of the two dimensional projected section data acquired from the work plane or some feature segments which are established and required to be corrected by the user are automatically fixed in their established constraint and dimensions in the step S130. The reverse modeling control unit 20 determines whether correction request from the user for the numerical information, etc. is detected (S150).

The user can correct the constraint and numerical information of the respective feature regions which are automatically established.

This procedure will be described in detail with reference to FIGS. 10 through 12.

Figure 10:
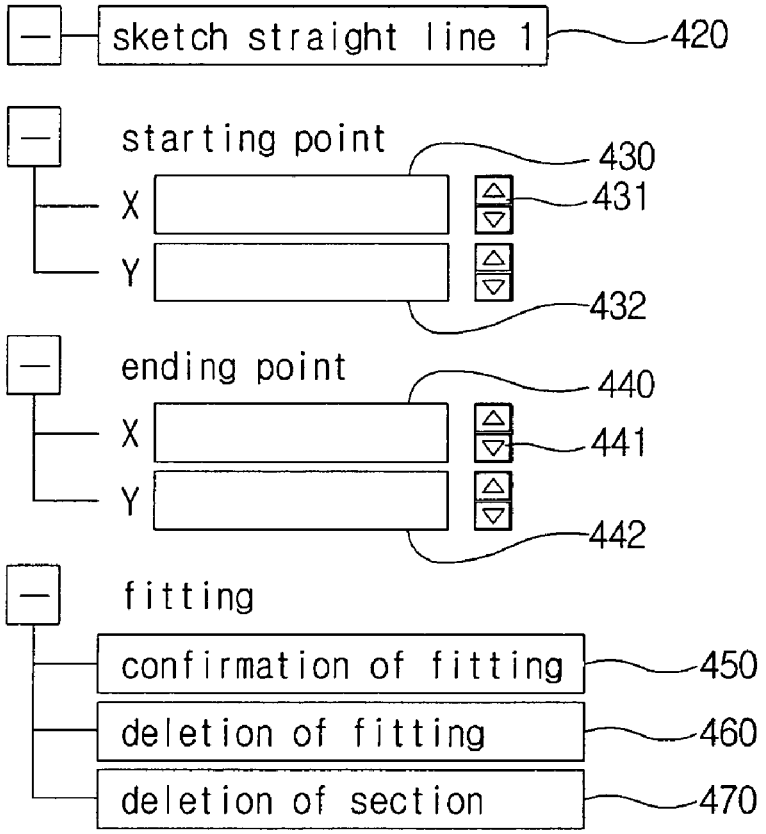
FIG. 10 is a view illustrating a process for setting the straight line of the two dimensional section silhouette.
Figure 10:
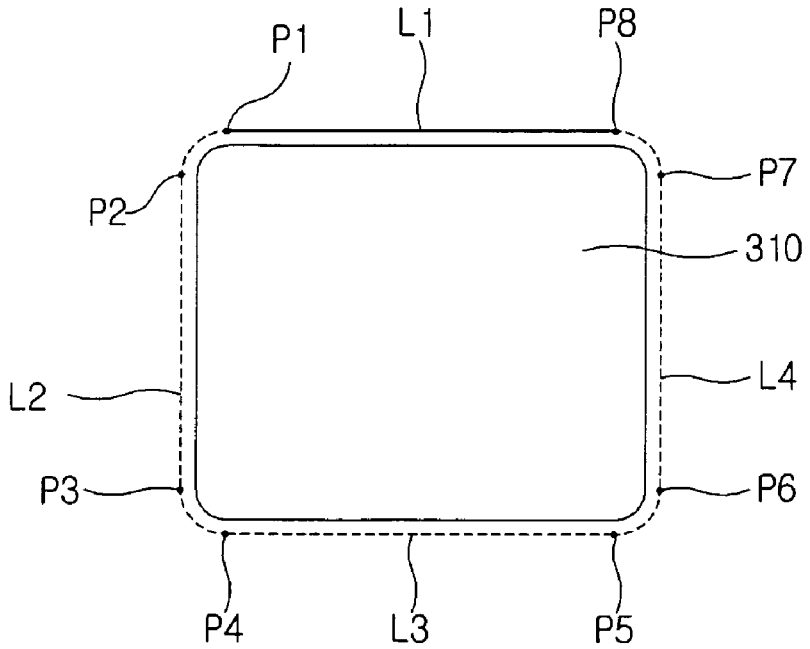
Figure 11:
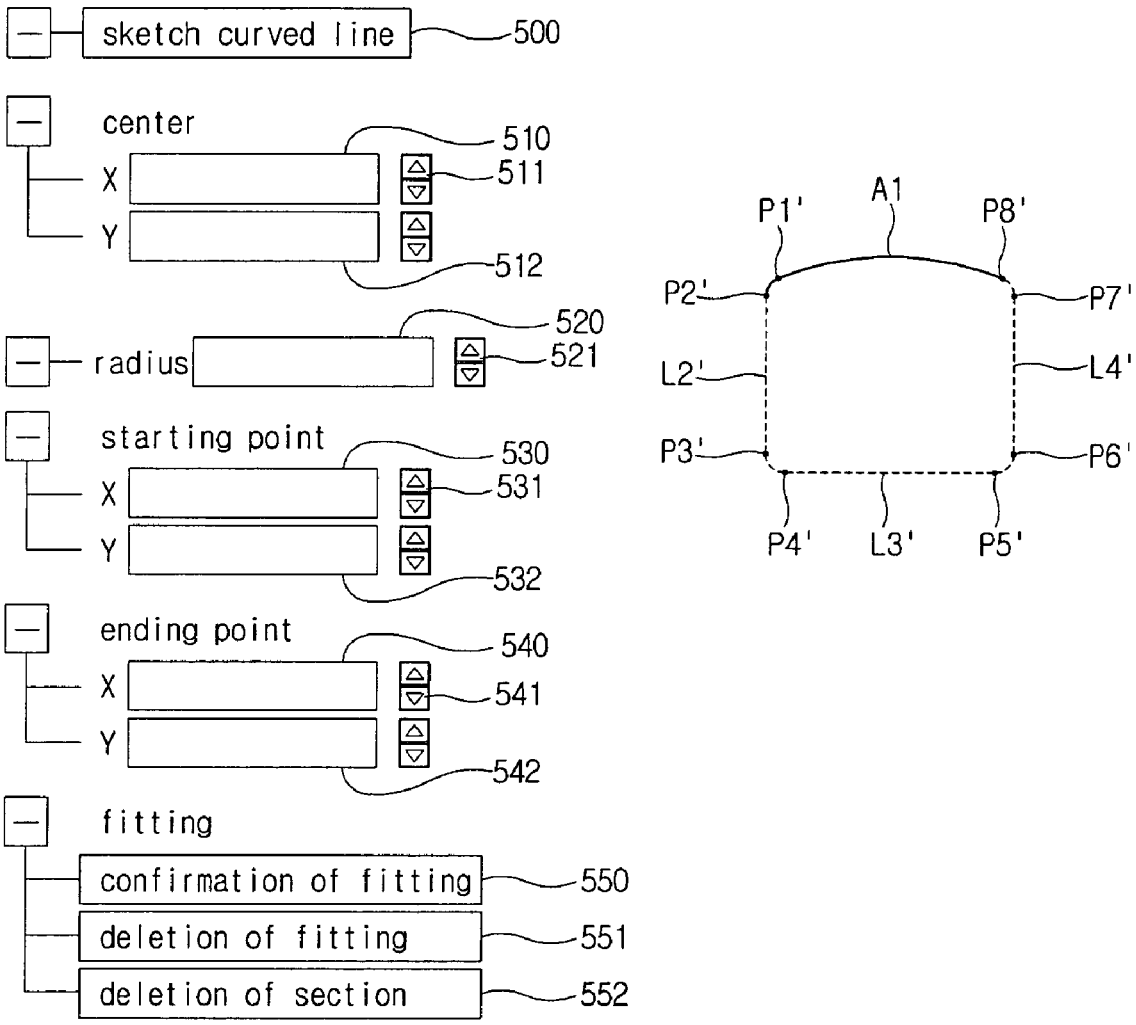
FIG. 11 is a view illustrating a process for setting the curved line of the two dimensional section silhouette.

As shown in FIG. 10, if the user requests to correct the straight line L1 among the constraint and numerical information of the projected part which are automatically established, for example, sketch straight line 1" 420 is displayed on the display unit 30 (see FIG. 1), and the X-axis coordinate 430 and Y-axis coordinate 432 of the starting point P1 of the straight line L1 and the X-axis coordinate 440 and Y-axis coordinate 442 of the ending point P8 of the straight line L1 are detected and displayed on the display unit 30.

At this time, as shown in FIG. 10, the straight line L1 to be corrected can be represented by a thick solid line or by another color and be highlighted. Excluding the straight line L1 to be corrected, the remaining straight line L2 between the points P2 and P3, straight line L3 between the points P4 and P5 and straight line L4 between the points P6 and P7 are represented by dashed lines or by a color which is different from that of the straight line L1 to be corrected.

Also, other than the method in which the user directly inputs the coordinates of the starting point P1 and the ending point P8, it is possible to implement correction using combo boxes 431 and 441.

Further, establishment information, such as "confirmation of fitting" 450 which causes the coordinates and length of the currently displayed straight line L1 to be stored, "deletion of fitting" 460 which causes the coordinates and length of the currently displayed straight line L1 to be deleted, and "deletion of section" 470 which causes the currently displayed straight line L1 to be deleted, is detected from the user input unit 40 (see FIG. 1) so that the straight line L1 can be appropriately reestablished.

As shown in FIG. H, if the user requests to correct the curved line (arc) A1 among the constraint and numerical information of the projected part which are automatically established, for example, "sketch curved line" 500 is displayed on the display unit 30 (see FIG. 1), the X-axis coordinate 510 and Y-axis coordinate 512 of the center of the curved line A1 are displayed, and the radius 520 of the curved line A1 is displayed.

In addition, the X-axis coordinate 530 and Y-axis coordinate 532 of the starting point P8' of the curved line A1 and the X-axis coordinate 540 and Y-axis coordinate 542 of the ending point P1' of the curved line A1 are detected and displayed on the display unit 30.

At this time, as shown in FIG. H, the curved line A1 to be corrected can be represented by a thick solid line or by another color and be highlighted. Excluding the curved line A1 to be corrected, the remaining straight line L2' between the points P2' and P3', straight line L3' between the points P4' and P5' and straight line L4' between the points P6' and P7' are represented by dashed lines or by a color which is different from that of the curved line A1 to be corrected.

Also, other than the method in which the user directly inputs the coordinates of the center, the radius, the starting point and the ending point, it is possible to implement correction using combo boxes 511, 521, 531 and 541.

Further, establishment information, such as "confirmation of fitting" 550 which causes the numerical information of the currently displayed curved line A1 to be stored, "deletion of fitting" 551 which causes the numerical information of the currently displayed curved line A1 to be deleted, and "deletion of section" 552 which causes the currently displayed curved line A1 to be deleted, is detected from the user input unit 40 (see FIG. 1) so that the curved line A1 can be appropriately reestablished.

Figure 12:
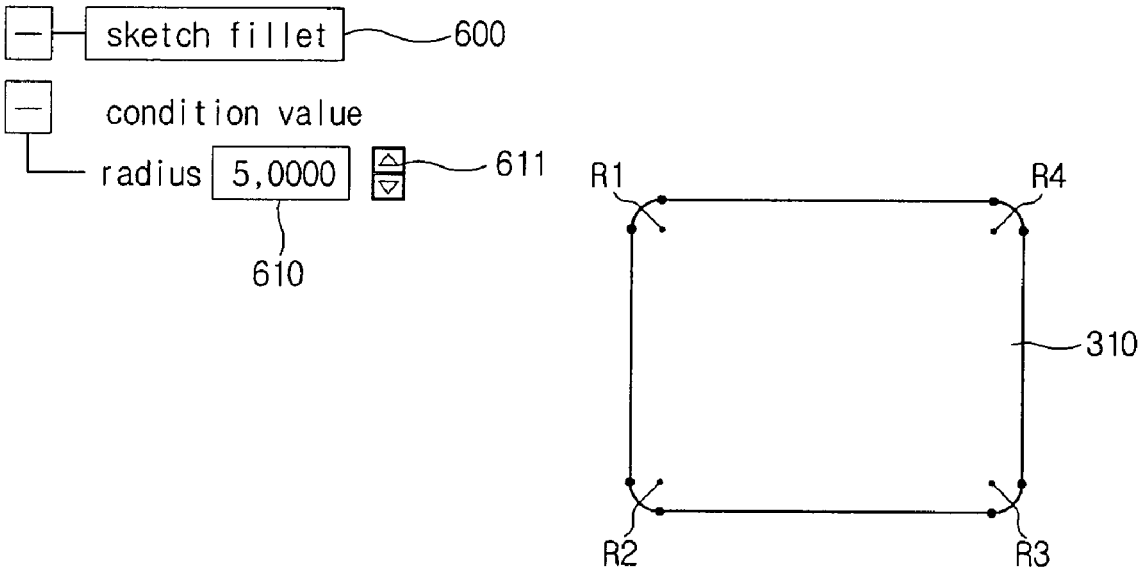
FIG. 12 is a view illustrating a process for setting the fillet of the two dimensional section silhouette.

Moreover, as shown in FIG. 12, if the user requests to correct the fillets R1 through R4 among the constraint and numerical information of the projected part which are automatically established, for example, "sketch fillet" 600 is displayed on the display unit 30 (see FIG. 1), and the constraint and radius 610 of the fillets are displayed on the display unit 30.

At this time, as shown in FIG. 12, the fillets R1 through R4 to be corrected can be represented by a thick solid line or by another color and be highlighted.

Also, it is possible to set different constraint for the respective fillets, and unlike the method in which the user directly inputs the radius, it is possible to implement correction using a combo box 610.

Referring again to FIGS. 1 and 2, the modification and the display of the feature segments of the two dimensional projected section data corrected as described above are corrected, and numerical information and constraint information of the feature segments which are corrected are displayed on the display unit 30 (S160).

After the step S160 is implemented, the reverse modeling control unit 20 establishes the two dimensional projected section data produced in the step S160 as two dimensional sketch data and stores the two dimensional sketch data in the data storage unit 50 (S170).

As is apparent from the above descriptions, the present invention provides advantages in that, since modeling work is conducted based on the model data of a modeling object, the efficiency of the modeling work is improved, and the time of modeling work is shortened.

Also, in the present invention, based on the model data of the modeling object, including point cloud data, mesh data, general CAD data, and CAD data having curved surfaces, which are obtained by a scanner, it is possible to automatically extract the two dimensional sketch feature regions of the model data.

Further, in the present invention, since two dimensional, sketch data are parametrically connected with one another, they can be automatically updated when a condition or information is newly set or changed.

Moreover, due to the fact that the information of the feature regions of the two dimensional sketch data is displayed in real time, a user can easily find and correct an error.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for detecting two dimensional sketch data from source model data for three dimensional reverse modeling, comprising the steps of:

a) receiving model data generated by scanning an object from a scanner, establishing X-axis, Y-axis and Z-axis of the model data depending upon a reference coordinate system information inputted from a user, and setting a work plane for detecting two dimensional section data of the model data;

b) projecting, on the work plane, two dimensional section data to be detected from the model data or polylines detected by designating a detection position;

c) detecting two dimensional projected section data of the model data projected on the work plane, and dividing the two dimensional projected section data into feature segments depending upon a curvature distribution; [and]

d) establishing a constraint and numerical information in accordance with connection of the divided feature segments of the two dimensional projected section data, and creating two dimensional sketch data*; and*

*e) displaying the two dimensional sketch data.*

2. The method as set forth in claim 1, wherein the two dimensional section data of the step b) is established at a position which is vertically offset from the work plane or is determined by rotating the work plane about a measurement axis.

3. The method as set forth in claim 1, wherein the two dimensional section data of the step b) is converted into a UV coordinate system by rotating the work plane and is then established in U and V directions thereof.

4. The method as set forth in claim 1, wherein, when the two dimensional section data of the step b) has a draft, a measurement range having the draft is established so as to acquire a precise section from the model data, and a silhouette of the model data which is included in the established measurement range is projected on the work plane.

5. The method as set forth in claim 4, wherein the measurement range corresponds to a region between two planes established by the user.

6. The method as set forth in claim 4, wherein a value of the draft corresponds to a cosine of a triangle which is formed by a base corresponding to a distance between the two planes and a height corresponding to a difference in size between two dimensional section data respectively projected on the two planes.

7. The method as set forth in claim 1, wherein the step b) comprises the step of inserting a polyline optionally selected by the user into a feature region projected on the work plane or of overlapping a polyline detected from the model data and having a third specific shape on the feature region projected on the work plane.

8. The method as set forth in claim 1, wherein the feature segment projected on the work plane in the step c) is one selected from the group consisting of a straight line, a circle, an arc, a free curve, a rectangle, a polygon and a slot.

9. The method as set forth in claim 1, wherein the constraint and numerical information of the step d) are conditions which are fitted from the feature segments of the two dimensional projected section data including a straight line, a circle, an arc, a free curve, a rectangle, a polygon and a slot, or which are set by the user to satisfy at least one of verticality, horizontality, parallelism, slopeness, junction, fixing, correspondence, the same straight line, concentricity, the same radius, and the same distance between the feature segments.

10. The method as set forth in claim 9, wherein the constraint and numerical information are automatically established in accordance with an internal tolerance between the feature segments of the two dimensional projected section data or are manually established or corrected by data inputted from the user.

11. The method as set forth in claim 10, wherein the feature segment to be manually established or corrected is selected through snapping for automatically fixing a cursor of a mouse in the vicinity of a node of points constituting the feature segment of the two dimensional projected section data to be established or corrected.

12. The method as set forth in claim 1, wherein the feature segment of the two dimensional projected section data is displayed by being highlighted.

13. The method as set forth in claim 1, wherein the feature segments, constraint and numerical information of the two dimensional projected section data projected on the work plane are parametrically connected with one another.

14. The method as set forth in claim 1, wherein the created two dimensional sketch data is displayed as one element of a feature tree.

15. The method as set forth in claim 1, wherein the model data is one selected from the group consisting of scanned data, point cloud data, mesh data, general CAD data, and CAD data having curved surfaces.

* * * * *